United States Patent
Zuckerman et al.

(10) Patent No.: US 7,155,924 B2
(45) Date of Patent: Jan. 2, 2007

(54) PORTABLE AIR CONDITIONER

(75) Inventors: Raymond S. Zuckerman, Scottsdale, AZ (US); Bryan R. Falk, Chandler, AZ (US); Thomas M. Rosenbaum, Scottsdale, AZ (US); Ronald N. Shostack, Los Angeles, CA (US)

(73) Assignee: Coolwell, LLC, Los Angeles, CA (US)

( * ) Notice: Subject to any disclaimer, the term of this patent is extended or adjusted under 35 U.S.C. 154(b) by 328 days.

(21) Appl. No.: 10/935,924

(22) Filed: Sep. 7, 2004

(65) Prior Publication Data
US 2005/0172658 A1 Aug. 11, 2005

Related U.S. Application Data

(63) Continuation-in-part of application No. 10/775,915, filed on Feb. 9, 2004.

(51) Int. Cl.
*F25D 3/02* (2006.01)
(52) U.S. Cl. .............................. 62/424; 62/434; 62/441
(58) Field of Classification Search .................. 62/406, 62/424, 426, 434, 441, 457.4, 457.9
See application file for complete search history.

(56) References Cited

U.S. PATENT DOCUMENTS

| | | | |
|---|---|---|---|
| 768,622 A | 8/1904 | Peacock | |
| 774,811 A | 11/1904 | Witter | |
| 1,196,169 A | 8/1916 | Stillman | |
| 1,782,612 A | 11/1930 | Hardin | |
| 1,902,246 A | 3/1933 | Kitchen | |
| 1,922,790 A | 8/1933 | Alger | |
| 1,952,414 A | 3/1934 | Brizzolara | 62/133 |
| 2,060,482 A | 11/1936 | Ballman | 62/131 |
| 2,093,853 A | 9/1937 | Snavely | 62/131 |
| 2,118,044 A | 5/1938 | Gudmundsen | 62/91.5 |
| 2,196,310 A | 4/1940 | Kalin | 62/91.5 |
| 2,557,004 A | 6/1951 | Lepper | 62/133 |
| 2,564,998 A | 8/1951 | Sayers | 62/133 |
| 3,043,116 A | 7/1962 | Fuller | 62/244 |
| 3,164,971 A | 1/1965 | Gentz | 62/241 |
| 3,224,218 A | 12/1965 | New | 62/239 |
| 3,248,897 A | 5/1966 | Stark | 62/259 |
| 3,575,009 A | 4/1971 | Kooney | 62/272 |
| 3,740,964 A * | 6/1973 | Herweg | 62/262 |
| 4,841,742 A | 6/1989 | Biby | 62/420 |
| 5,046,329 A | 9/1991 | Travis, III | 62/259.3 |

(Continued)

*Primary Examiner*—Melvin Jones
(74) *Attorney, Agent, or Firm*—Ellis & Venable, P.C.

(57) ABSTRACT

An apparatus and method for cooling air that utilizes a removable reservoir that may be filled with a consumable beverage or other cooled liquid or solid material. The bottom of the reservoir is made of a thermally conductive material that is placed within an air duct within a base unit that has a battery powered fan capable of drawing in warm air from outside of the base unit and cooling it by passing it over the thermally conductive material in a turbulent fashion and expelling it back into the surrounding environment. An expandable hose may also be included to direct the airflow in a desired direction or location. The unit may also include an alternative path for airflow such that the airflow may be heated. The unit may also be secured to an open air vehicle such as a golf cart to provide cooled or heated air for golf course patrons. Another important feature of the air conditioner is to provide a means to prevent unauthorized access to the contents of the reservoir as to prevent contamination of its contents.

18 Claims, 20 Drawing Sheets

U.S. PATENT DOCUMENTS

| | | |
|---|---|---|
| 5,062,281 A | 11/1991 | Oliphant et al. ............ 62/457.1 |
| 5,146,757 A | 9/1992 | Dearing ......................... 62/61 |
| 5,159,819 A | 11/1992 | Wong ........................... 62/419 |
| 5,197,301 A | 3/1993 | Holcomb ................... 62/457.1 |
| 5,724,824 A | 3/1998 | Parsons ........................ 62/171 |
| 5,762,129 A | 6/1998 | Elliott ....................... 165/48.1 |
| 5,953,933 A | 9/1999 | Cheng .......................... 62/425 |
| 6,119,477 A | 9/2000 | Chan ........................... 62/406 |
| 6,170,282 B1 | 1/2001 | Eddins ...................... 62/259.3 |
| 6,227,004 B1 | 5/2001 | Gerstein ....................... 62/421 |
| 6,401,483 B1 | 6/2002 | Kopp ........................... 62/420 |
| 6,427,476 B1 | 8/2002 | Eddins ...................... 62/457.2 |

\* cited by examiner

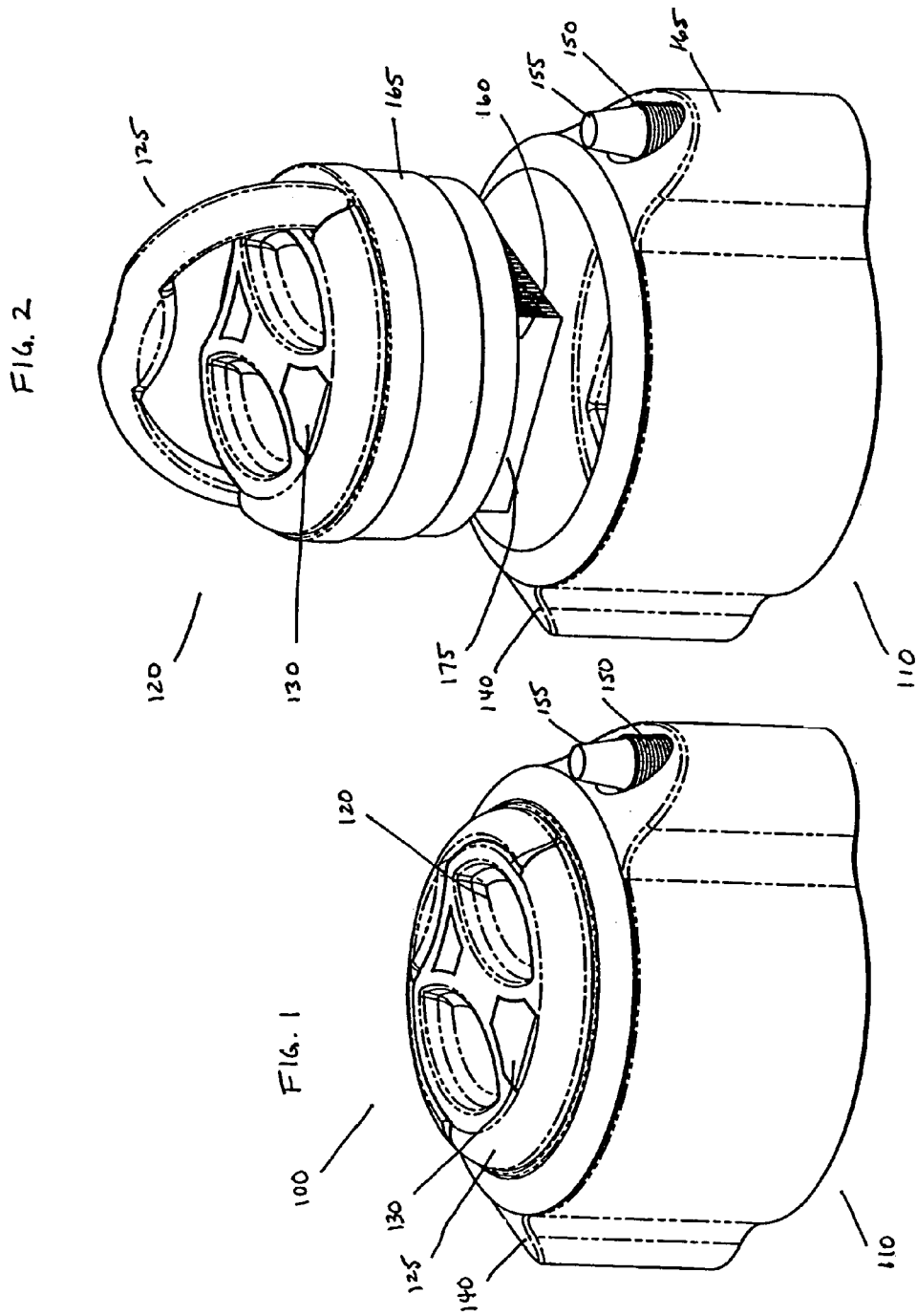

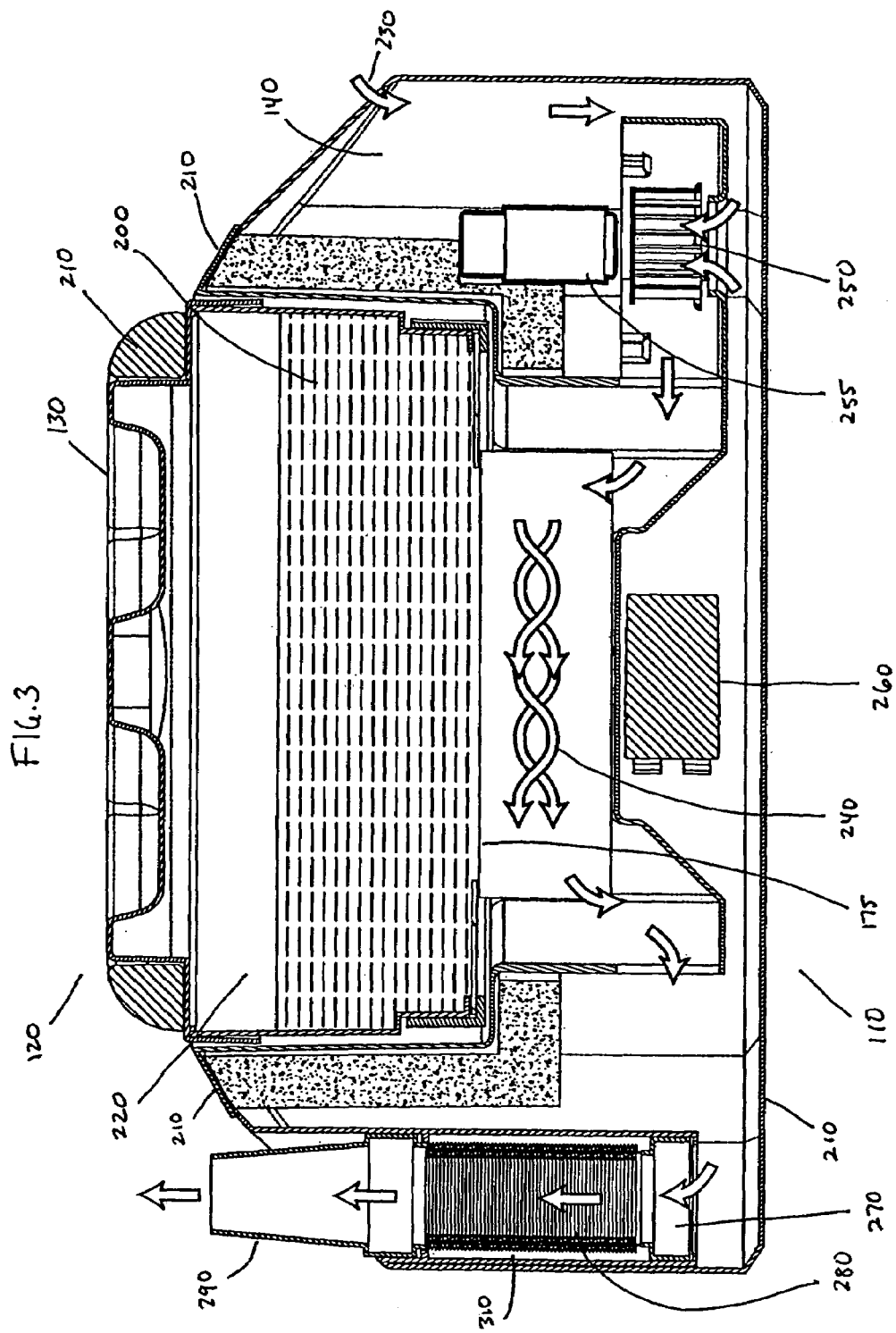

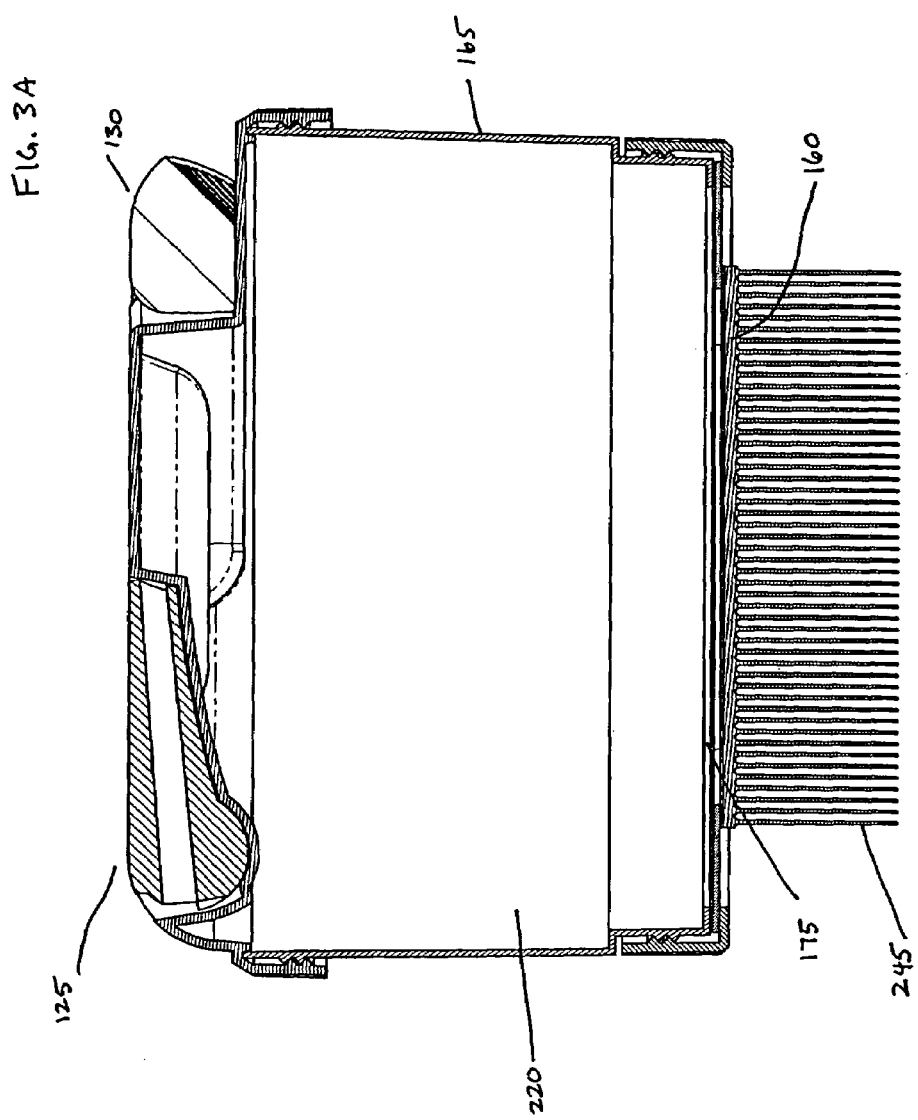

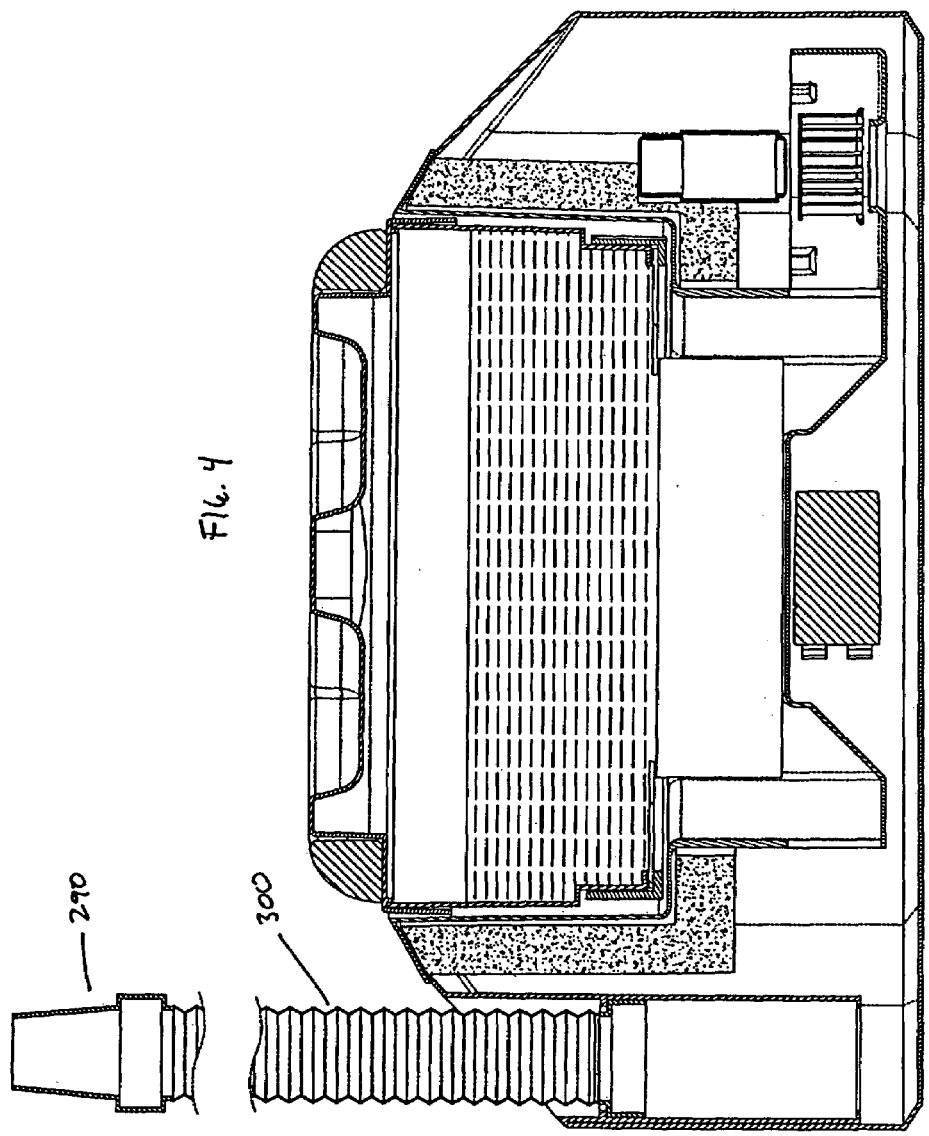

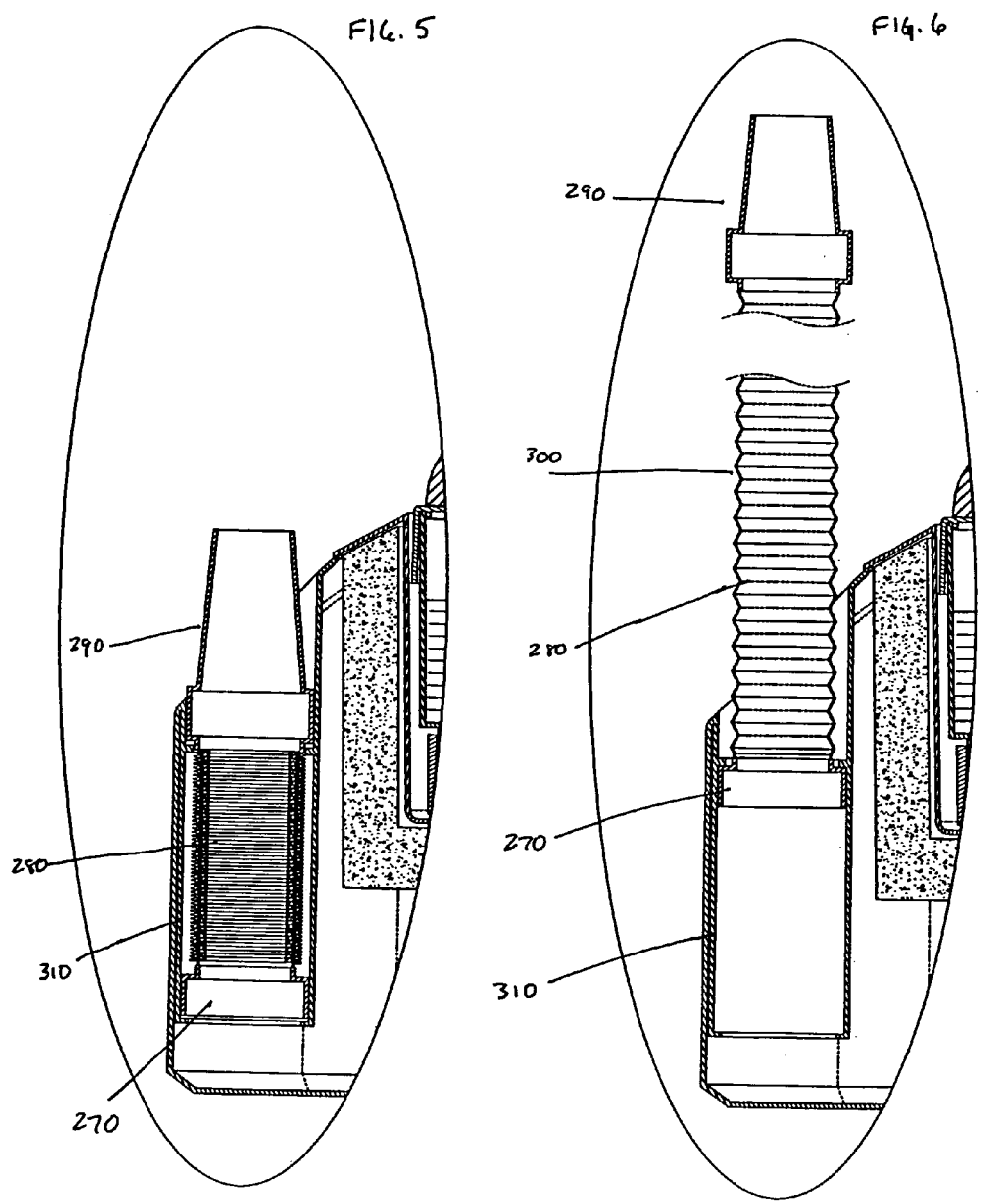

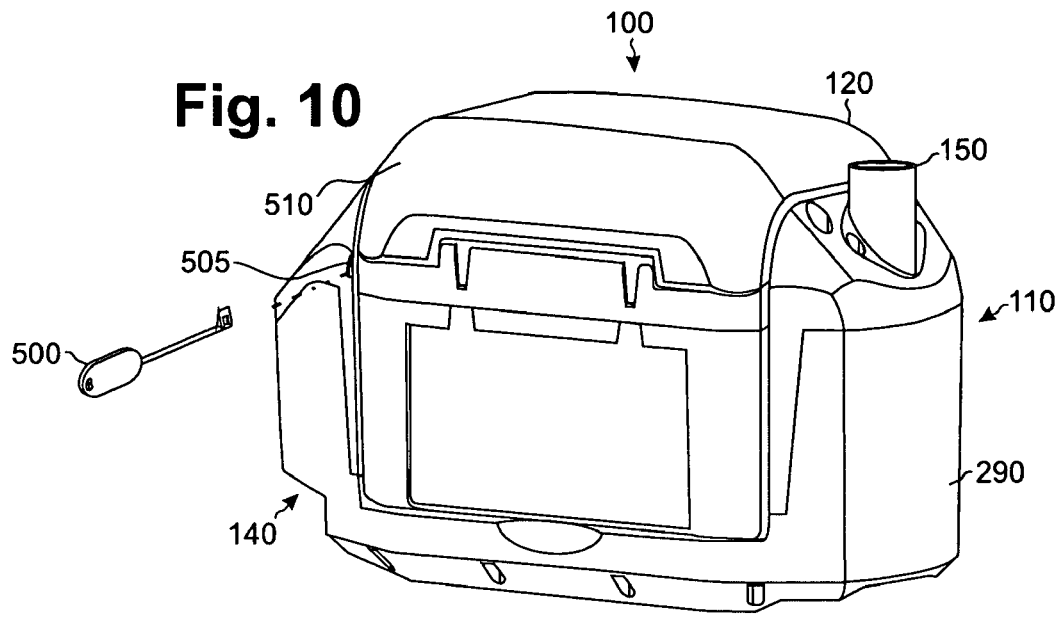
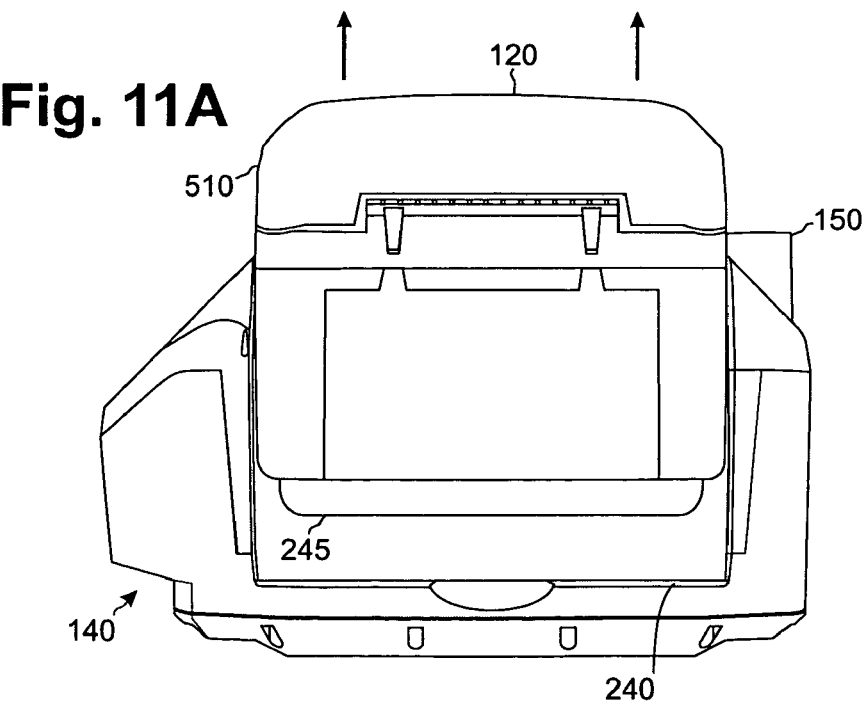

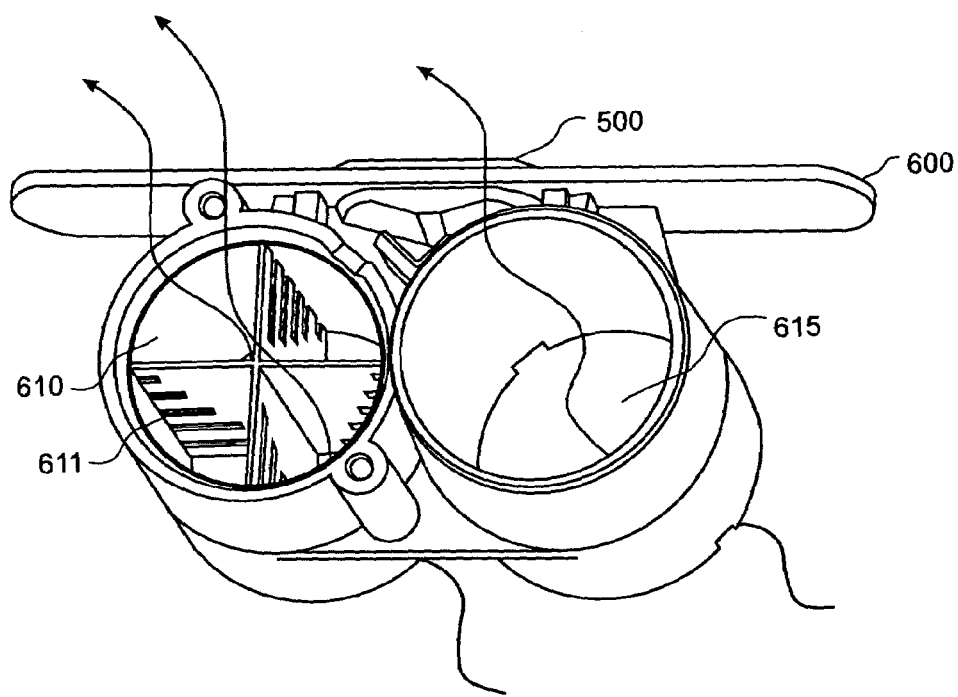

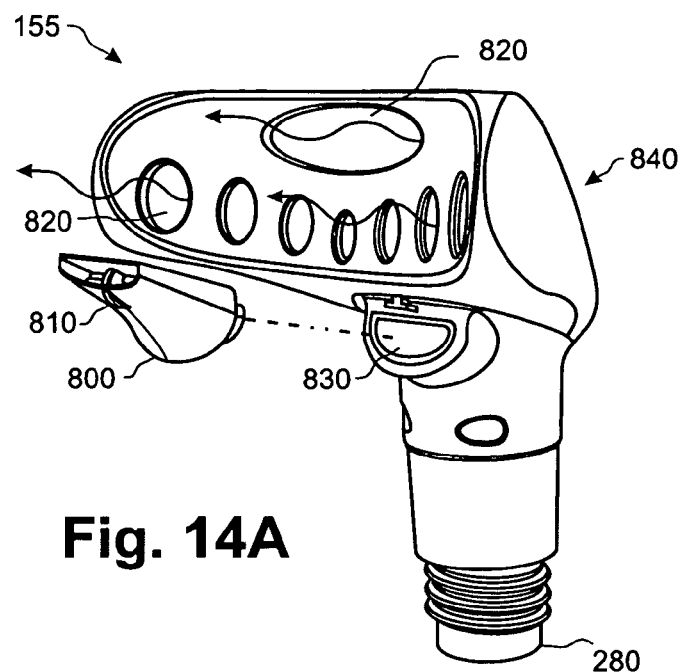
Fig. 14A
Fig. 14B
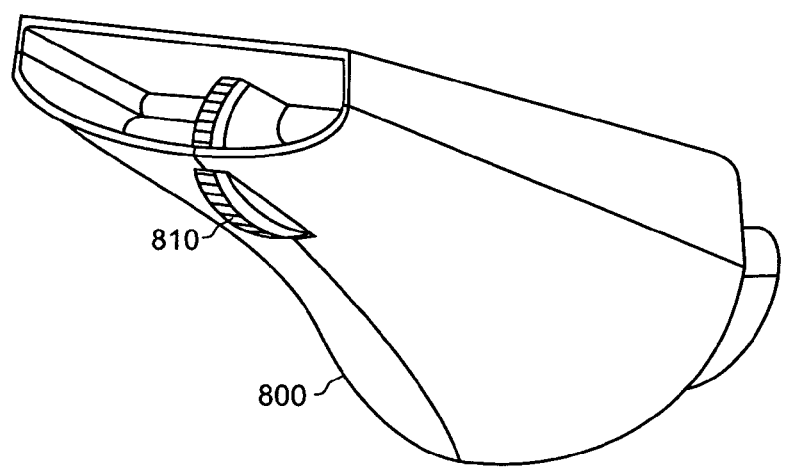

PORTABLE AIR CONDITIONER

The present invention is a continuation in part of earlier-filed U.S. patent application Ser. No. 10/775,915 filed on Feb. 9, 2004.

FIELD OF THE INVENTION

The present invention relates generally to portable air conditioning units for golf carts. Specifically, the air conditioning unit cools, and even scents the surrounding air by ingesting the surrounding air and cooling it by fanning the air across a surface area that is in direct contact with liquid that is much cooler than the surrounding air so that the surface area temperature approaches that of the liquid. The unit also heats the surrounding air by ingesting outside air that is warmed as it passes through heated coils. The unit also functions as a liquid storage container that may be used to store drinking water or other consumable beverages.

BACKGROUND OF THE INVENTION

Open-air golf carts are often utilized in extreme temperatures. For instance, when golfers play during the hot temperatures of summer or in the cold temperatures of winter, it is desirable to maintain a comfortable environment while driving around a golf course. One approach to address the problem would be to install a portable air conditioner in the golf cart itself. However, air conditioning units are very expensive, bulky, contain elements that are potentially harmful to the environment, and often require an AC external power source to operate. Because most golf carts run on battery power, it would be very difficult to power an air conditioning unit unless it was small enough or could be powered by its own battery.

One other major concern on many golf courses is to avoid transmitting potentially harmful bacteria between humans that may grow in standing water on the courses. Golf courses often use reclamated water in its ponds, streams and to water the grass on the course. Some golf courses have experienced instances of sickness and deaths to patrons who have come into contact with contaminated water on the course. It is certainly desirable to prevent golf course employees or patrons from contaminating the water supply, especially when it comes to water that may sit dormant for many hours in warmer climates.

The present invention addresses these concerns by providing a portable air condition unit that both cools and heats the surrounding air during the usage of a golf cart. The present invention makes use of a portable apparatus that includes a reservoir for cooled liquid or ice that is isolated from human contact by means of a locking mechanism, and may be accessible only by those authorized to do so. The reservoir is insulated with the exception of its bottom surface, which doubles not only as the bottom area of the reservoir, but also as the top to a heat sink that provides the area below the reservoir which acts as an air duct. The heat exchange system is substantially hollow but may also contain a series of fins that are in contact with the reservoir. The heat exchange system is designed to maximize the exposure of the air to the exposed surface area of the reservoir since the only air that is cooled is the air that directly comes in contact with the exposed surface of the reservoir. Generally, the heat exchange system should be located on the bottom of the unit so the heat transfer between the outside air and the bottom surface area of the reservoir may occur even when there are very low levels of cooled liquid in the reservoir. This would take advantage of the principle that the coldest liquid will always remain at the bottom of the container while in a given environment thus making an even more efficient cooling system.

When the reservoir is filled with cold liquid or ice, the exposed surface area of the reservoir becomes cooled to the temperature of the reservoir's contents. The heat exchange system is connected on one side by an air intake chamber and by an air exhaust chamber on the other. Warm air is drawn into the intake chamber from a battery-powered variable-speed motorized fan that creates a vacuum. The fan then pushes the warm air through the heat exchange system and is dehumidified and cooled by coming into direct contact with the exposed surface area of the reservoir and fins that extrude perpendicularly from the bottom surface of the reservoir within the coil system. The fins provide resistance and vary the direction of the air, creating turbulence. Also, coolness from the exposed surface area is transferred down through the fins providing additional cooled surface area, which contacts and further cools the air. The turbulence greatly enhances the thermal conductive capacity of the system so that the heat transfer can occur at a highly efficient rate and maximizes the time that the temperature of the exposed surface of the reservoir remains cold. The cooled air is then propelled into the exhaust chamber where it is thrust into the external environment and may be directed at an individual or used to generally cool a surrounding area.

Over a period of time while cold fluid comes in contact with the surface of the heat exchanger that is exposed to the interior of the reservoir or container, a narrow region next to the surface of the heat exchanger exists where the velocity of the fluid is zero and rapidly changes to a finite number as the distance from the surface increases. This is known as the boundary layer. The fluid's velocity is zero due to a variety of factors ranging from molecular attraction to surface tension to friction. When a boundary layer forms, it may prevent the surface area of the fins from efficient thermal conductivity between the inner reservoir to the surface area of the fins. This lack of conduction is due to the layer of insulation the boundary layer creates from the fluid directly adjacent to the exposed surface of the heat exchanger.

When the ambient air temperature is sufficiently cold, the unit also serves to heat the outside air by drawing in cool air into the unit and passing the air through a series of heated coils before being expelled back into the environment. The unit works much in the same way as a hair dryer heats ambient air. Generally, the user may select either the heating or cooling process by a switch that redirects the air through a given path depending on whether heating or cooling is desired. The air conditioning unit itself may be set to switch on only when one or more persons are seated within the golf cart. This is accomplished by using a seat switch to sense the presence of a person in either the driver or passenger seat of the cart.

The reservoir may also include additional features such as holding area for beer and soda cans to keep them cold and an aroma cartridge to scent the surrounding air. The reservoir may also be removed from the unit so that its contents may be stored in a refrigerated environment. This allows multiple reservoirs to be used in succession thereby increasing the amount of time that cool air may be generated. Another feature of the apparatus is that the airflow may be directed by means of an extendable hose, which is embedded within the exhaust chamber of the unit. The entire external surface of the unit should be heavily insulated in order to prevent unwanted heat from coming into contact with the reservoir's contents.

It is also understood that to a person of reasonable skill in the art that the underlying claimed invention for a portable air conditioner can be utilized in other applications such as automobiles, boats, RVs, trucks, patio furniture, stadium seating or any similar application.

DISCUSSION OF THE PRIOR ART

The use of air conditioners is known in the prior art. More specifically, air conditioners that cool the surrounding air that exchange heat while passing outside air over cooled surfaces is discussed in the prior art. Other similar portable air conditioning devices are disclosed in U.S. Pat. Nos. 6,427,476; 6,227,004; 6,119,477; 5,953,933; 5,062,281; 5,046,329; and 4,841,742. A portable air conditioning device used with golf carts is disclosed in U.S. Pat. No. 5,724,824.

While these devices aim to function as air conditioners, and while each invention disclosed in the respective patents may disclose a feature of the present invention, none of the above-listed patents disclose the combination of features in the present invention either individually or in combination with each other in such a way that it would have been obvious to do so at the time the present invention was conceived.

In addition, there is a need in the art for a device which can function as a portable air conditioner and a beverage container for a golf cart that maximizes the time that ambient air may be cooled to a temperature much lower than the ambient air temperature and accomplishes these tasks utilizing a removable cooling source in combination with a directed application of the cooled air. The device should be capable of dispensing warm air as well. A device of this type is disclosed by the present invention.

SUMMARY OF THE INVENTION

Broadly, it is an object of the present invention to provide a portable air conditioner that includes a separate container for storing cold water or ice.

It is a further object of the present invention for the container to be composed of a thermally conductive material for storing cold liquid or ice.

It is a further object of the present invention to provide a portable air conditioner that utilizes a motorized fan to ingest outside air and cool it by passing the air over a substantial portion of the thermally-conductive, non-toxic material before propelling the cooled-air back into the environment.

It is a further object of the present invention to minimize the temperature of cooled air by passing the air through a turbulent environment.

It is a further object of the present invention to provide a method of cooling outside air that efficiently ingests outside air, and cools it by passing the outside air in a turbulent manner over and through a cooled surface area of a container and expelling the cooled air into the environment.

It is a further object of the present invention to position the thermally-conductive material on the bottom of the container.

It is a further object of the present invention to maximize the efficiency of heat exchange by minimizing the effects of the formation of a boundary layer on the thermally-conductive material.

It is a further object of the present invention to provide a removable container that may be removed from a base unit and easily and thoroughly sanitized.

It is a further object of the present invention to provide a locking mechanism that will prevent unauthorized access to the reservoir area.

It is a further object of the present invention to provide a locking mechanism that prevents the removal of the reservoir.

It is a further object of the present invention to provide an area directly adjacent to the reservoir area to store drink containers in a thermally insulated area that is not contaminated by the contents of the reservoir.

It is a further object of the present invention to provide a heating coil for heating air that is ingested into the air conditioner so that the heated air may be expelled into the area surrounding the air conditioner.

It is a further object of the present invention to use the portable air conditioner in conjunction with an open-air vehicle such that the air conditioner may be switched on whenever a person is seated in the open-air vehicle.

It is a further object of the present invention to provide a means to acoustically dampen the internal noise of the air conditioner fan.

It is a further object of the present invention to provide a separate exhaust path for warm air and cold air.

It is a further object of the present invention to provide a means to scent the air expelled from the air conditioner.

It is a further object of the present invention to provide an adjustable and expandable hose that may be used to direct the flow of conditioned air where desired.

The description of the invention which follows, together with the accompanying drawings should not be construed as limiting the invention to the example shown and described, because those skilled in the art to which this invention appertains will be able to devise other forms thereof within the ambit of the appended claims.

BRIEF DESCRIPTION OF THE DRAWINGS

FIG. 1 is a perspective view of the apparatus;

FIG. 2 is a perspective view of an apparatus showing the removable container separate from the base of the apparatus;

FIG. 3 is a front view in cross section of the apparatus demonstrating the direction of air intake, flow and expulsion from the apparatus;

FIG. 3A is a side view in cross section of the removable reservoir;

FIG. 4 is a front view in cross section of the apparatus with the expandable hose fully extended;

FIG. 5 is a detailed view of the expandable hose fully retracted;

FIG. 6 is a detailed view of the expandable hose fully extended.

FIG. 10 is a perspective view of the portable air conditioner with the locking mechanism that secures the removable portion of the unit to the base unit.

FIG. 11a is a side view of the portable air conditioner unit demonstrating the removable portion of the unit being lifted from the base unit.

FIG. 12e is a detailed view of the heating and cooling switch.

FIG. 14a is a perspective and exploded view of an alternate embodiment of the air exhaust guide with the aroma cartridge.

FIG. 14b is a front view of the air guide with a variable aroma control.

DESCRIPTION OF THE PREFERRED EMBODIMENT

Figure 3B:
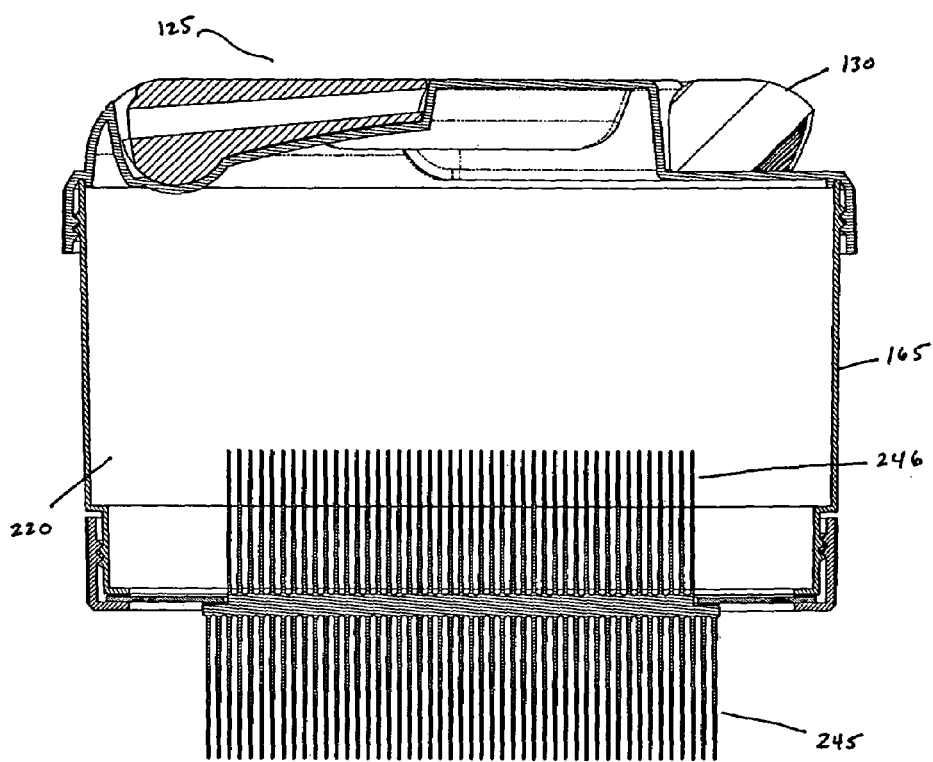
FIG. 3B is a front cross-sectional view of the reservoir with the thermally-conductive surface area extending inside of the reservoir.

By way of one example of many to serve as background in understanding the present invention, FIG. 1 shows a portable air conditioner 100 that includes a base unit 110 and a removable beverage container 120. The container 120 is intended for storing a liquid or solid whose temperature is substantially colder than the air temperature outside of the air conditioner 100. A spout 130 provides access to the contents of the container 120 which may include a chilled beverage such as ice water. A handle 125 is included for easy portability. The container 120 is secured within the base unit 110 as shown in FIG. 1. The external portion of the base unit 110 includes an air intake valve 140 that takes in air from outside of the air conditioner 100 for processing within the unit 110 and is expelled out an air nozzle 155. The air nozzle 155 is connected to an expandable hose 150 such that expelled air from the nozzle 155 can be directed to a given location.

In FIG. 2, the container 120 is shown removed from the base unit 100 with its handle 125 fully extended. The container 120 comprises a highly thermal-conductive, non-toxic material such as aluminum that is heavily insulated on all sides 165 but the lower portion 160. The lower portion 160 is exposed and comes into direct contact with the base unit 110 when secured. It is a primary goal for the lower portion 160 to obtain, and subsequently retain, the same temperature of the liquid or solid inside of the container 120 for as long as possible, and to remain in constant contact with the surface area 175 thereby cooling the surface area 175 to the temperature of the liquid 200 inside the reservoir 220. The surface area 175 of the lower portion 160 is used to cool any air that comes into contact with the surface area 175. Because the container 120 is removable, it is possible to fill the container 120 with a given liquid and store it in a refrigerated environment for use at a later time. The container 120 may also be filled with liquid and stored in a freezer so that the entire contents of the container 120 becomes frozen. A typical size of the container 120 can hold between one half and two gallons of liquid.

FIG. 3 shows the cross-sectional view of the air conditioner 100 with the container 120 secured within the base unit 110. As shown, a cooled liquid 200 is filled approximately ¾ to the top of a reservoir 220. The container 120 is surrounded on all sides by insulation 210 in order to maximize the time that the cooled liquid 200 retains its original temperature.

Air from outside of the air conditioner 100 is drawn into the air intake chamber 140 by means of an high-speed electric motor 255 that may be powered by a battery 260. An alternative embodiment of the invention may include an AC/DC power source. However, an AC/DC power source is understood to limit the portability of the air conditioner 100. The motor 255 turns a rotating fan 250 in a manner that creates an airflow 230 that pulls in warmer air from outside of the air conditioner 100. It is desirable to minimize the volume of the air intake chamber 140 while maximizing the amount of airflow 230. The airflow 230 follows the general direction as shown with the arrows through from the air intake chamber 140 through the fan 250 and into the central chamber 240. It is desirable to maximize the volume of the chamber 240 while creating turbulence in the air through the use of fins 245 (FIG. 3A). The fins 245 would be in direct contact with the lower surface area 175 and would create an environment such that the air molecules would maximize the time that they come in contact with the conductive surface area 175 thereby allowing the temperature of the airflow 230 to be minimized so that it may approach the temperature of the liquid 200 inside of the reservoir 220. Because the chamber 240 is in direct contact with the lower portion 160 (FIG. 3A) of the container 120, the lower portion 160 is able to continually cool the surface area 175 for as long as there is even a minimal amount of liquid 200 remaining in the reservoir 220.

As shown in FIG. 3A, one embodiment of the removable container 120 demonstrates how the cooled surface area 160 may be arranged to maximize the length of time that the airflow 230 may come in direct contact with the cooled surface area 160. As can readily be seen, the lower surface area 175 of the reservoir 220 is configured with a series of vertically arranged fins 245 that protrude perpendicular to the lower surface 175. The fins 245 are comprised of an efficient thermally-conductive material such as aluminum or copper. It is understood that the fins 245 are not required to be positioned exactly perpendicular to the lower surface 175. As stated above, because the fins 245 are directly connected to the lower surface 175 of the reservoir 220, the temperature of the surface areas of all fins 245 will drop to the temperature of the lower surface 175 which would be the temperature of the contents 200 of the reservoir 220. As the airflow 230 passes between the fins 245, the airflow 230 will have a maximum amount of cooled surface area in which it will come in contact thereby minimizing the temperature of the airflow 230. The airflow 230 will also bounce back and forth between each of the fins 245 thereby creating an air turbulence 240 as shown in FIG. 3. In an alternative embodiment, the fins 245 can be arranged in a maze-like formation such that the airflow 230 would reverse its direction of travel several times thus creating more turbulence and still enabling the airflow 230 to maximize the surface area of the fins 245 that it contacts.

Alternatively, in FIG. 3B the fins 245 may form one continuous thermally conductive surface with fins 246 that extend within the reservoir 220. In some instances during the heat exchange process, a thin layer of ice may form on the fins 245 which may decrease the efficiency of heat exchange. This may occur in the same way that ice may accumulate in a refrigerator-freezer that electrically cools a thermally-conductive metal surface as its primary source for heat exchange. With the addition of the fins 246 that are directly connected to the fins 245 it was noticed that a substantial reduction, and in many cases, a complete elimination of the boundary layer would occur. As a result, a more efficient heat transfer may occur thereby maintaining the coldest possible temperature on the surface area of the fins 245 for the longest possible time.

Figure 3C:
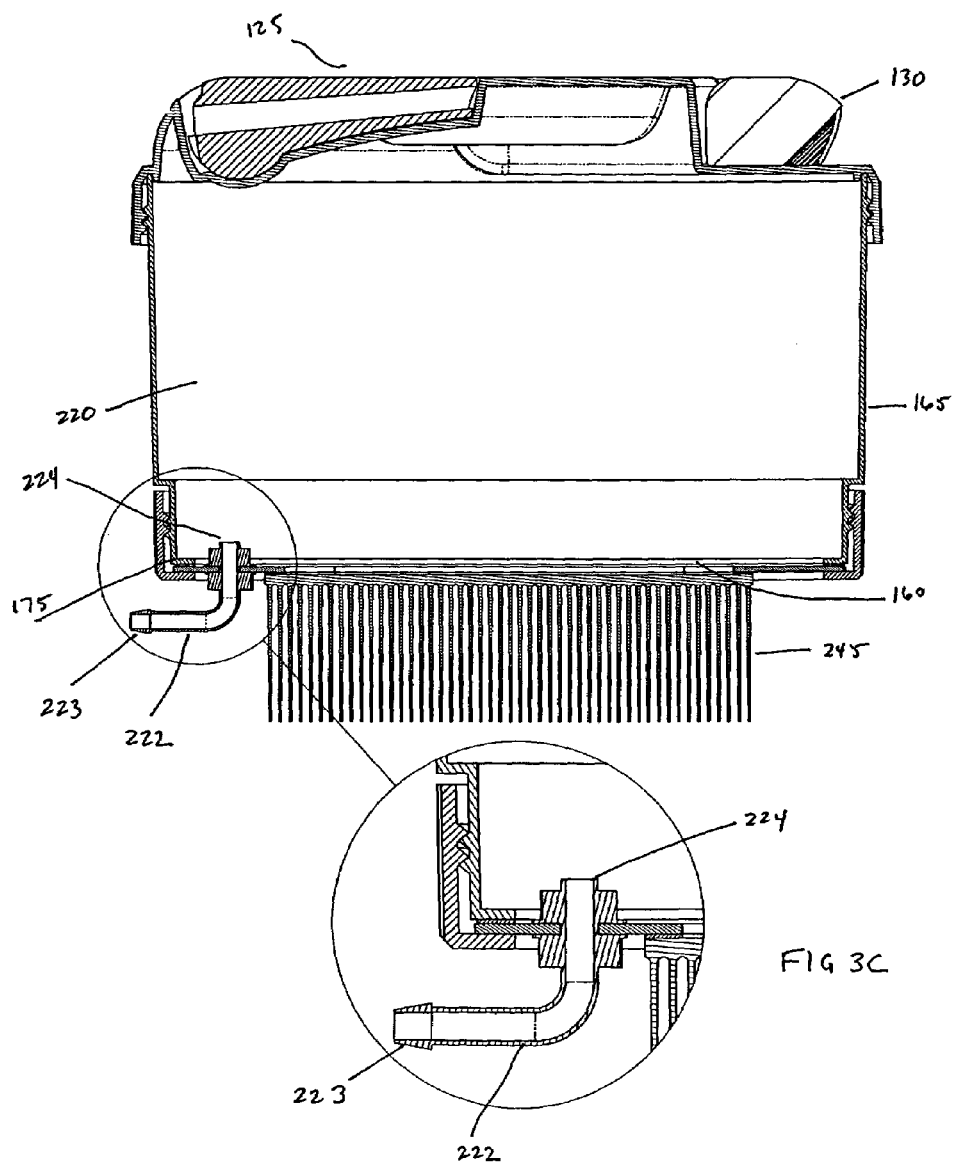
FIG. 3C is a front cross-sectional view of the reservoir with a drainage tube for removing excess liquid from the inside of the reservoir.

In an alternative embodiment that also serves to address the problem of boundary layer formation, FIG. 3C offers an alternative approach when the contents of the reservoir are intended to be completely frozen. A drainage pipe 222 is included at the lower surface 175. The pipe 222 has an opening 224 that extends within the reservoir 220 and a cap 223 on the external end of the pipe 222. When this embodiment is used with a reservoir 220 that contains frozen contents, the pipe 222 is used to drain excess liquid that may melt from the frozen contents over time. Through experimentation, it was learned that a boundary layer would frequently form on the fins 245 when using only frozen contents in the reservoir 220. However, when excess water was drained away from the reservoir 220, the boundary layer would appear less frequently on the fins 245, and many times not at all.

Figure 3D:
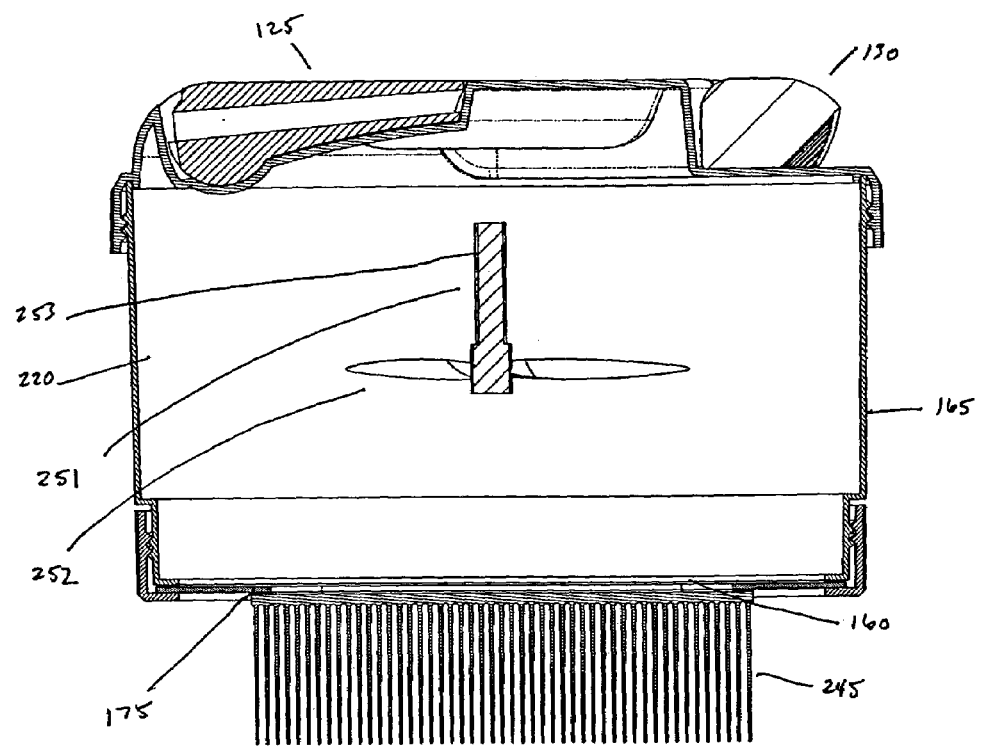
FIG. 3D is a front cross-sectional view of the reservoir with an agitator for mixing the contents inside of the reservoir.

In another embodiment as shown in FIG. 3D, an agitator 251 is included within the reservoir 220. The agitator includes a set of blades 252 that are fixed perpendicular to a rod 253 such that when the rod 253 is rotated in a circular fashion, the blades 252 will mix the contents of the reservoir 220. This may be necessary when some of the frozen contents of the reservoir 220 become stagnant in one section of the reservoir 220. By mixing the contents of the reservoir 220, it will allow for the lower surface area 175 to maintain the temperature of the contents of the reservoir 220 for the longest period of time. It is understood that the agitator 251 may operate either manually by means of an external crank, or electrically by means of a motor. This embodiment may also be combined with the embodiments in FIG. 3B or 3C.

Referring back to FIG. 3, upon exiting the chamber 240, the airflow is now cooled substantially below the ambient air temperature and proceeds toward the exhaust chamber 290. In the preferred embodiment, the airflow 230 travels through an expandable hose 280 that may be extended like an accordion 300 as shown in FIG. 4 to direct the airflow 230 in whatever direction and point desired by an individual.

FIGS. 5 and 6 show more detailed drawings of the expandable hose 280 that is connected to the exhaust valve 290. The hose 280 is attached on one end to a catch 270 and on the other end by the exhaust valve 290. As shown in FIG. 5 with the hose 280 in its fully retracted position, the combination of these three elements sits within an insulated exhaust guide 310 such that when the hose 280 is extended fully as shown in FIG. 6, the catch 270 may move upward within the guide 310 until it reaches the top of the guide 310 thus allowing the valve 290 to be directed to whatever location the user desires.

Figure 14C:
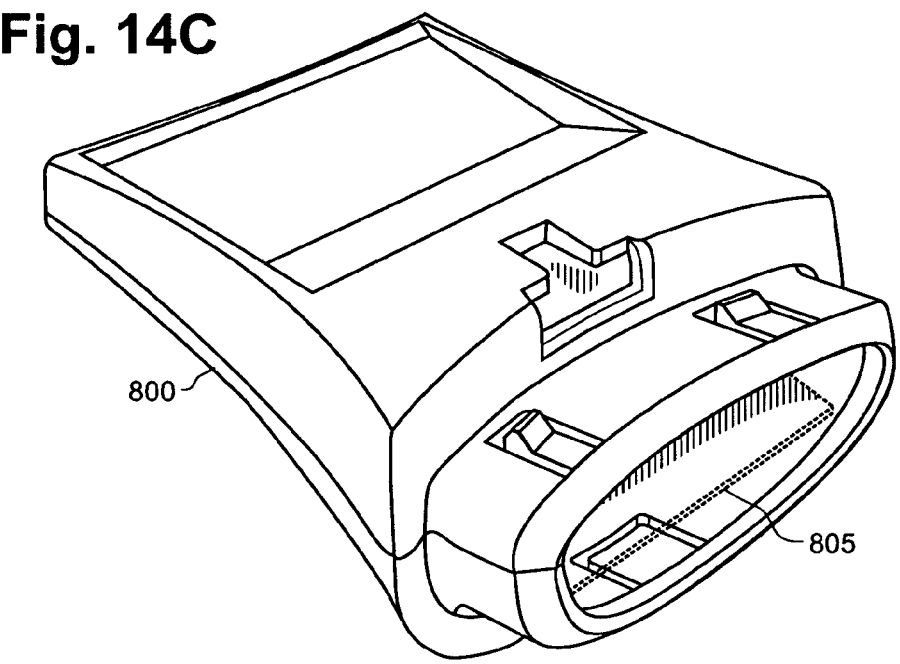
FIG. 14c is a rear view of the air guide with a scent card inserted.
Figure 14D:
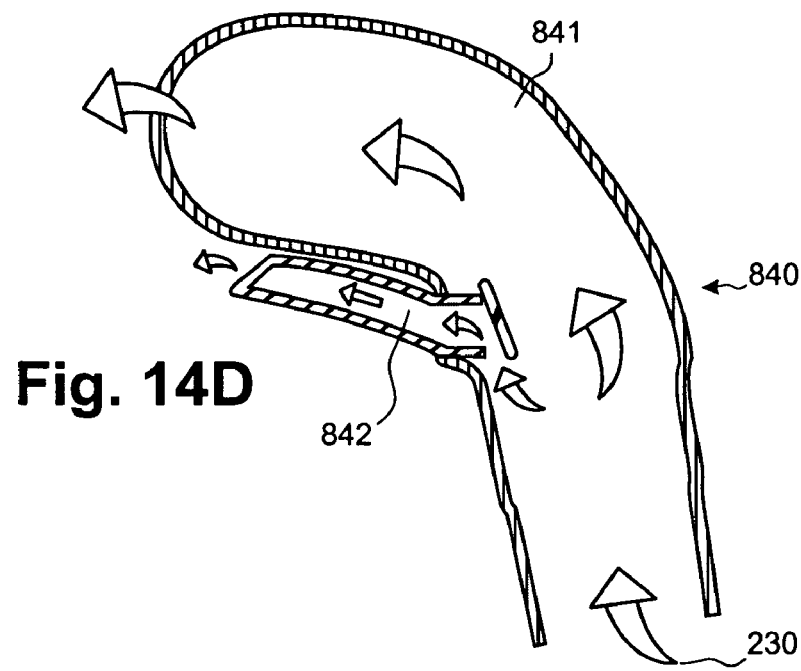
FIG. 14d is a cross sectional view of the air exhaust guide demonstrating airflow paths.
Figure 15:
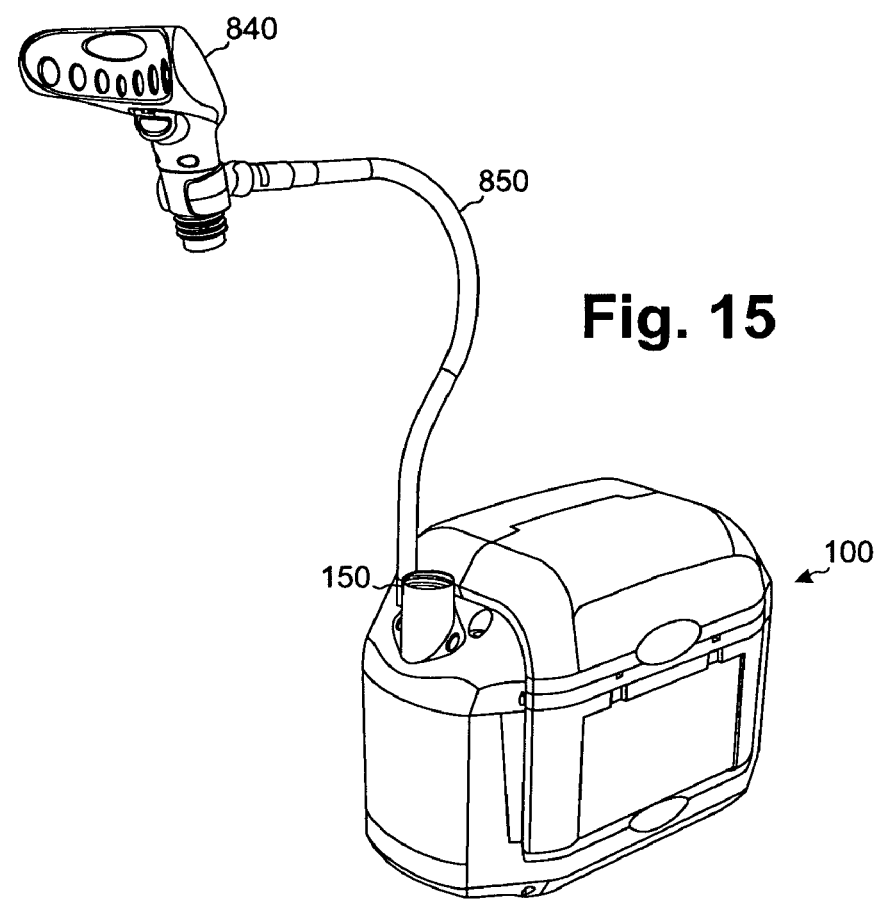
FIG. 15 is a view of the entire portable air conditioner unit with air exhaust guide adjustment and securing means.
Figure 16:
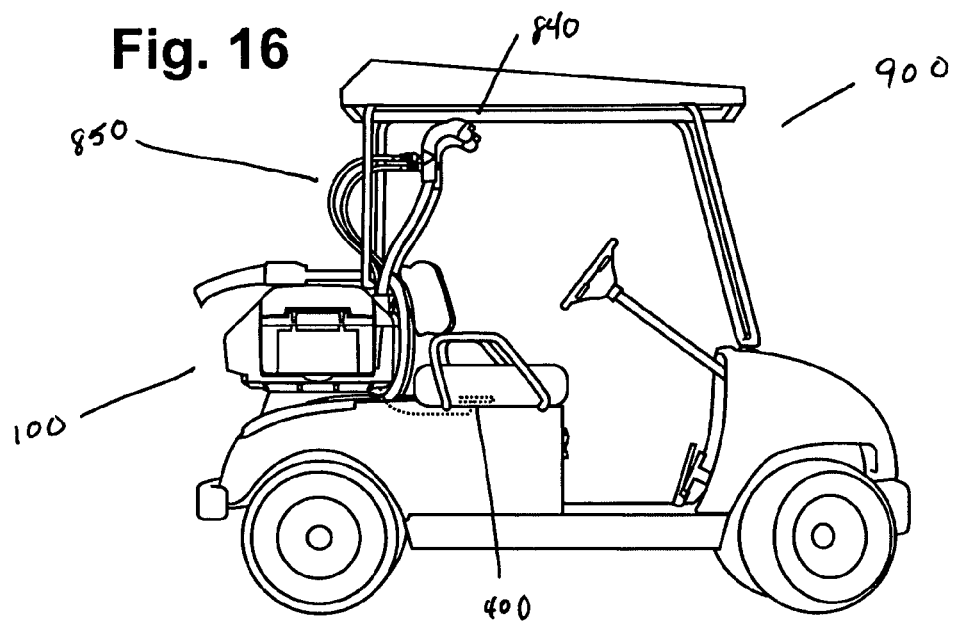
FIG. 16 is a view of the portable air conditioner unit installed on a golf cart.

FIGS. 7 through 16 demonstrate an alternate embodiment of the portable air conditioner with additional components that allow both chilled and heated air to be expelled into the surrounding environment. As shown in FIG. 16, the unit is used to cool or heat a golf cart or other mobile open-air vehicle.

Figure 7:
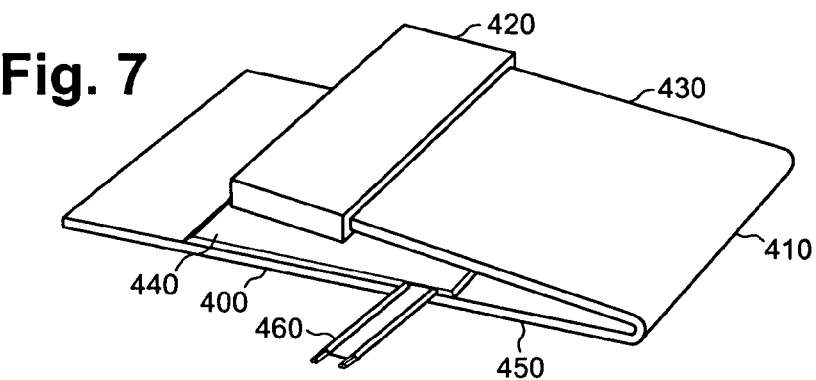
FIG. 7 is a perspective view of the seat switch used to activate the portable air conditioner.
Figure 8:
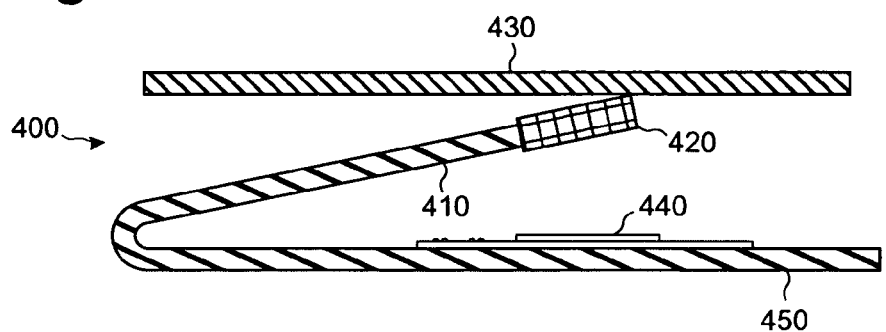
FIG. 8 is a detailed side view of the seat switch in the open position.
Figure 9:
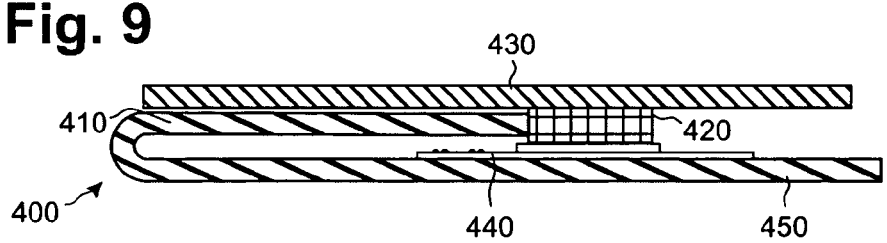
FIG. 9 is a detailed side view of the seat switch in the closed position.

As shown in FIGS. 7–9, a seat switch 400 is shown. The switch 400 is secured to either a passenger or driver seat 435 in a golf cart such that when a person is seated in either seat 435, the switch 400 activates the air conditioner 100. As shown in FIG. 8, the switch 400 is in the "open" position. The bottom of the cushion of the golf cart seat 430 is in direct contact with the top contact 420 by way of a flexible panel 450. The flexible panel 450 is secured to the golf cart 445 and maintains the switch 400 in the open position until a person is seated on the cushion 431. When a person is seated on the cushion 431, the flexible panel 450, by way of the top portion 410 of the flexible panel 450 is lowered onto the lower contact 440. When the contacts 420 and 440 converge, the switch 400 is changed to the "closed" position as shown in FIG. 9 thereby turning on the air conditioner 100 by way of wires 460 as shown in FIG. 7.

Figure 11B:
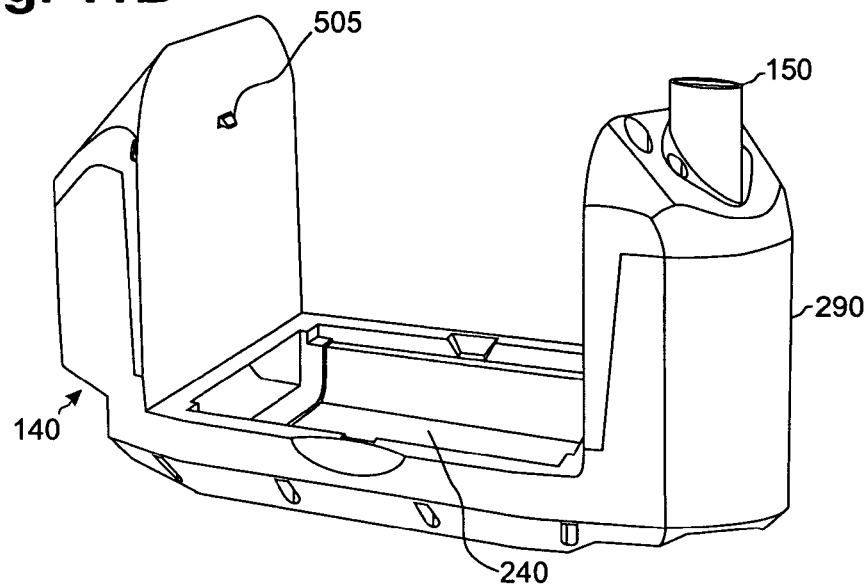
FIG. 11b is a perspective view of the base unit of the portable air conditioner.
Figure 11C:
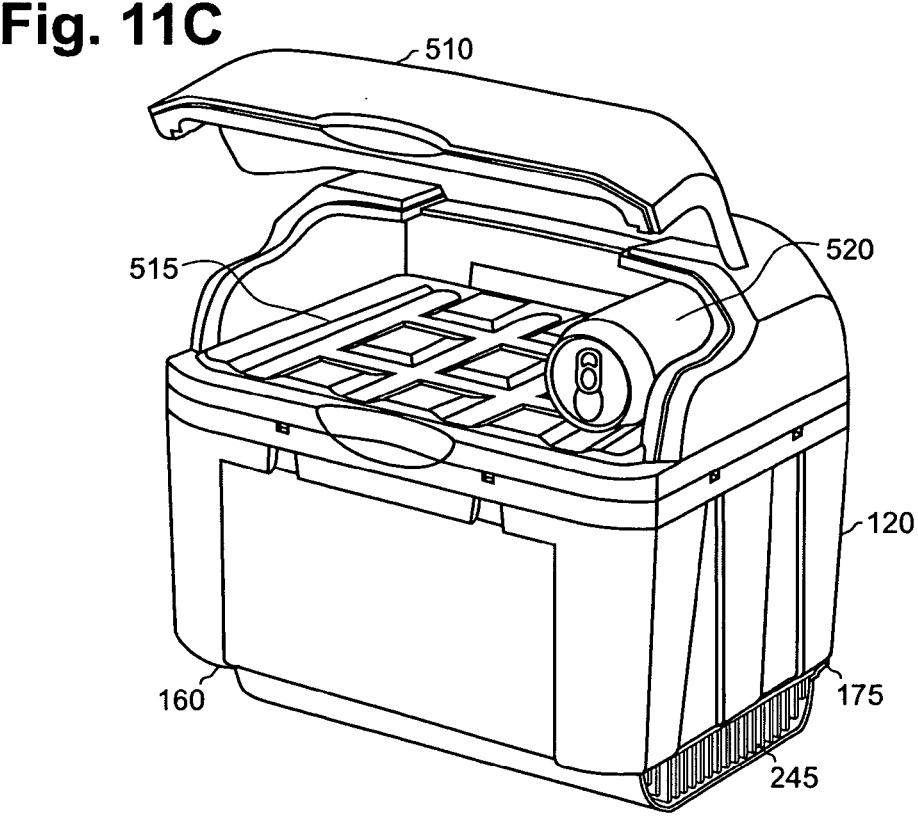
FIG. 11c is a perspective view of the removable portion of the unit in the open position showing stored beverage cans.

As shown in FIG. 10, the air conditioner 100 shows the alternate embodiment in its entirety with container 120 secured within the base unit 110. The modified air conditioner 100 utilizes a locking mechanism 505 that may be secured by a standard key 500. The locking mechanism 505 secures not only the entire container 120 within the base unit 110, but also secures the top of compartment 515 in a locked position so that within the compartment 515 the contents cannot be accessed by anyone not having authorized access to the compartment 515 as shown in FIG. 11C. When unlocked, the container 120 may be removed from the base unit 110 as shown in FIG. 11A. The modified base unit as shown in FIG. 11B displays the locking mechanism 505 and the recessed chamber 240. The unit in FIG. 11c shows drink containers 520 being stored in an insulated area between the top of the compartment 515 and below the hinged lid 510. Drink containers 520 cannot be contaminated by the contents of the compartment 515 that reside below them.

Figure 12A:
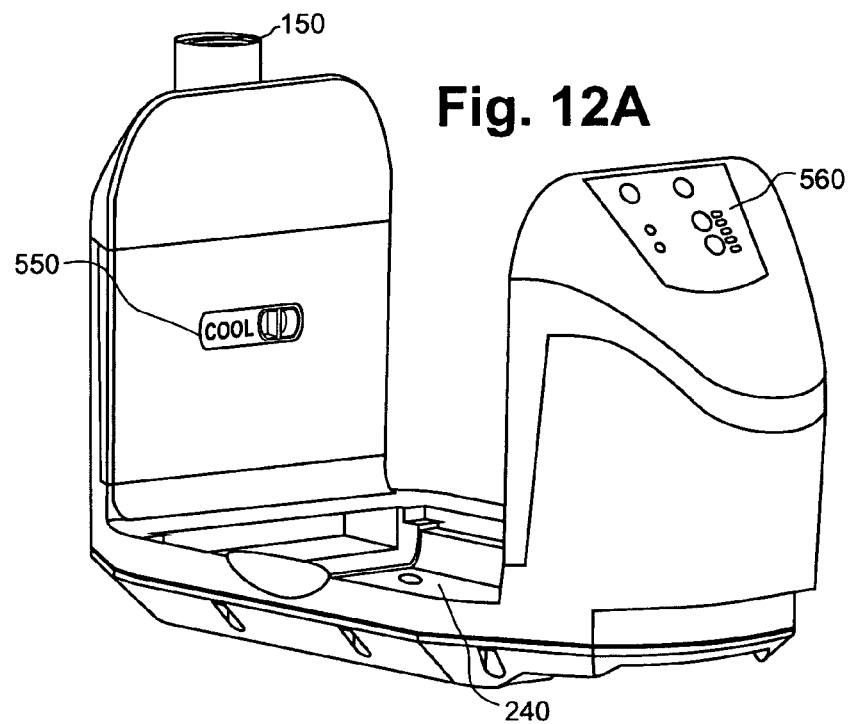
FIG. 12a is a perspective view of the base unit with the heating and cooling switch in the "cool" position.
Figure 12B:
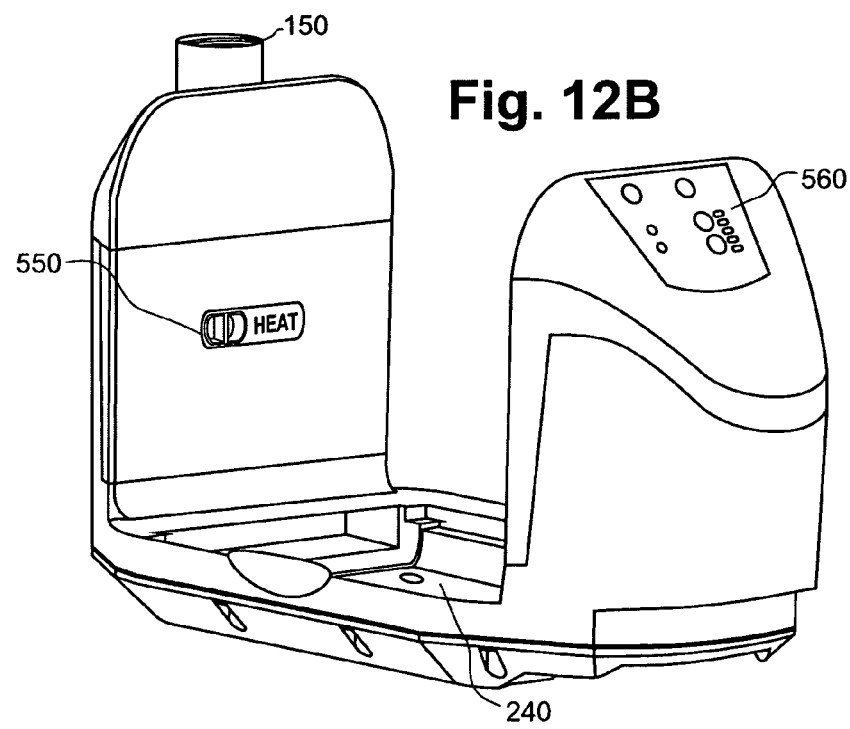
FIG. 12b is a perspective view of the base unit with the heating and cooling switch in the "heat" position.
Figure 12C:
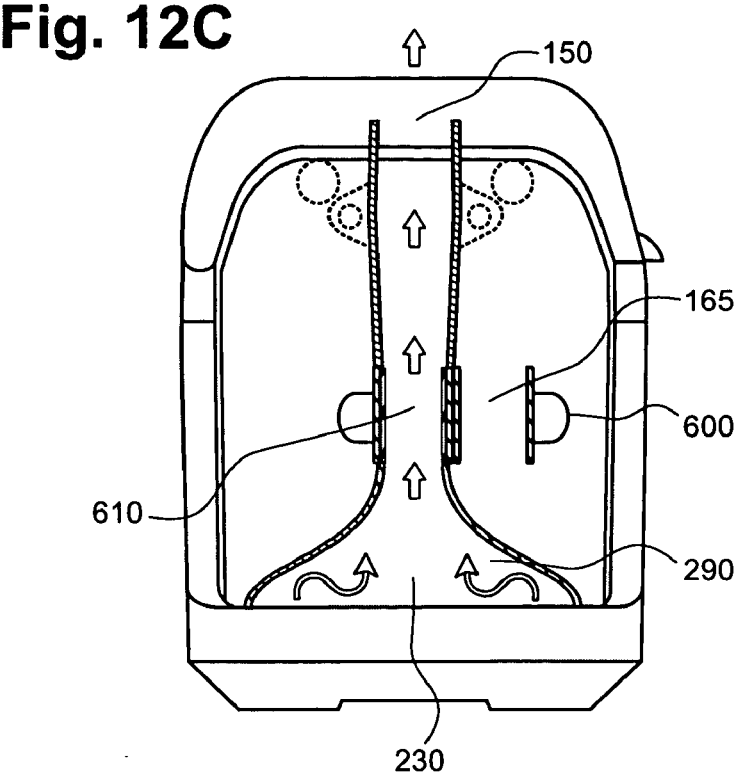
FIG. 12c is a cross-section of the air expulsion section of the base unit with the heating and cooling switch operating in the "heat" position.
Figure 12D:
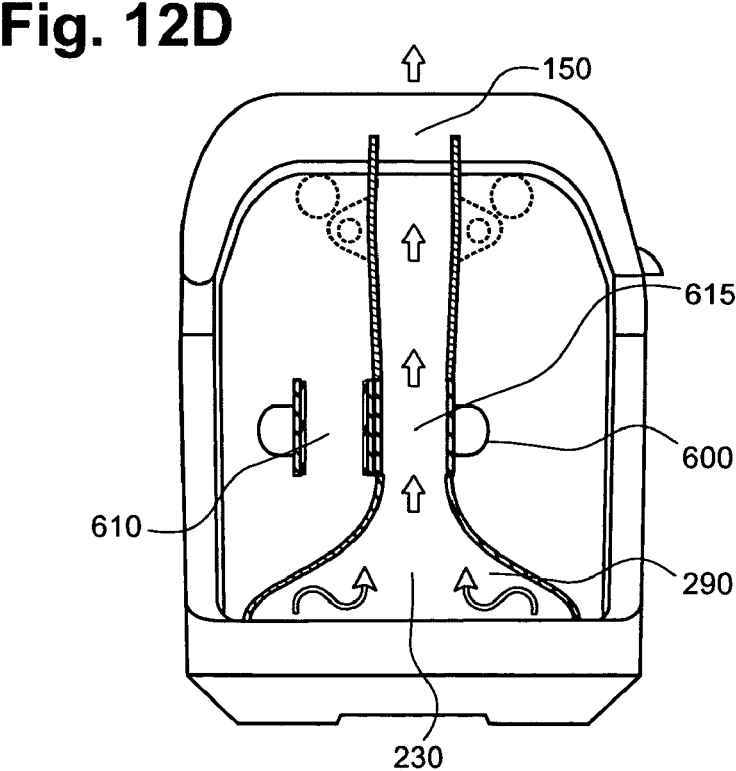
FIG. 12d is a cross section of the air expulsion section of the base unit with the heating and cooling switch operating in the "cool" position.

The alternate embodiment of the air conditioner 100 maintains the basic operation of ingesting ambient air into the intake valve 140 and expelling air out of the hose 150. However, in the modified golf cart embodiment, the user may select to use the air conditioner to either cool the surrounding air, or to heat it. The user may also vary the speed of the motor 255 that drives the fan 250 utilizing control 560 as shown in FIGS. 12A and 12B. As shown in FIGS. 12A through 12E, a switch 550 may be manually moved from left to right depending on whether heating or cooling is desired. FIGS. 12C through 12E provide a cross sectional detail of the exhaust chamber 290 that shows how the switch 550 operates. The switch 550 comprises two hollow cylindrical sections 610 and 615. Within cylinder 610, a heating element 611 is secured and may be switched on from the control 560.

FIG. 12C shows the switch 550 operating in the "heating" mode. When the airflow 230 enters the exhaust chamber 290 from the internal chamber 240, the air enters the cylinder 610 and across the heating element 611 in a fashion similar to that of a standard hair dryer. When the airflow 230 passes through the cylinder 610, it leaves at a much higher temperature than when it entered the cylinder 610. A sample heating element 611 is shown in more detail in FIG. 12E.

FIG. 12D shows the switch 550 operating in the "cooling" mode. When the airflow 230 enters the exhaust chamber 290 from the internal chamber 240, the air enters the cylinder 615 it passes directly through and unobstructed into the hose 150.

Figure 13A:
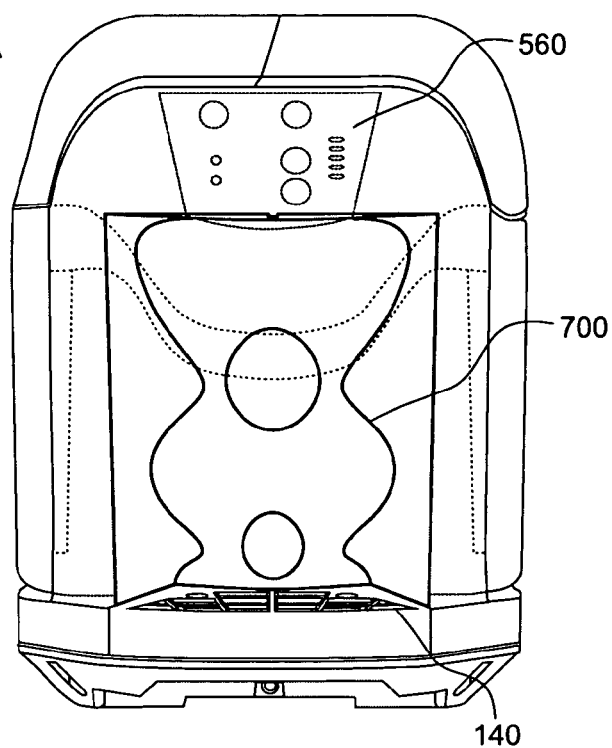
FIG. 13a is a cross section of the noise dampening element in the air intake section of the base unit.
Figure 13B:
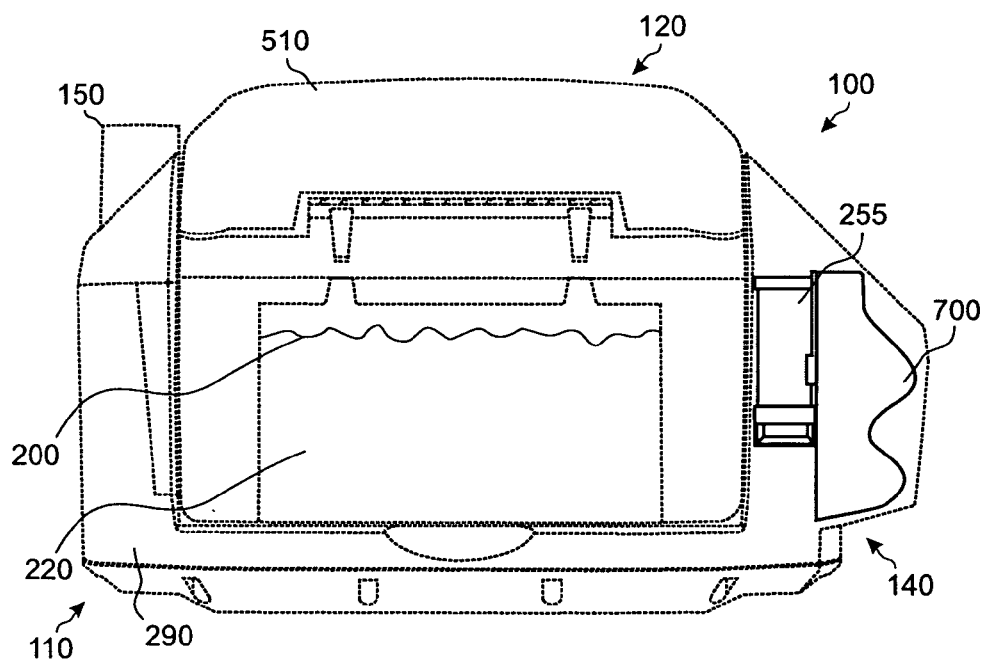
FIG. 13b is a side view showing fan and noise dampening element connected in the air intake section of the base unit.
Figure 13C:
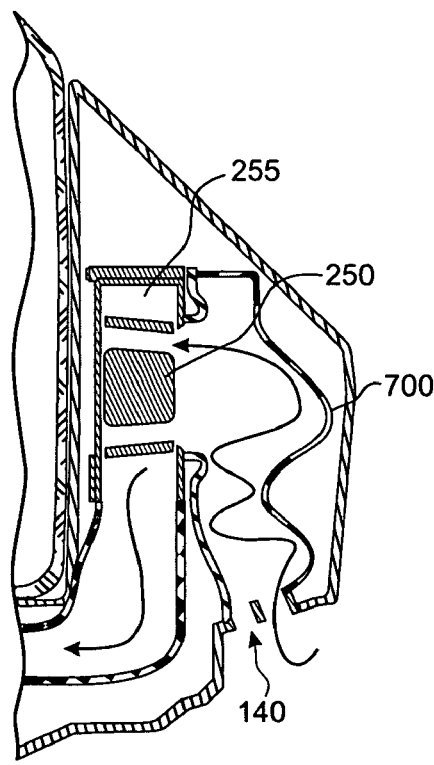
FIG. 13c is a detailed view of the fan and noise dampening element as connected in the air intake section of the base unit.
Figure 13D:
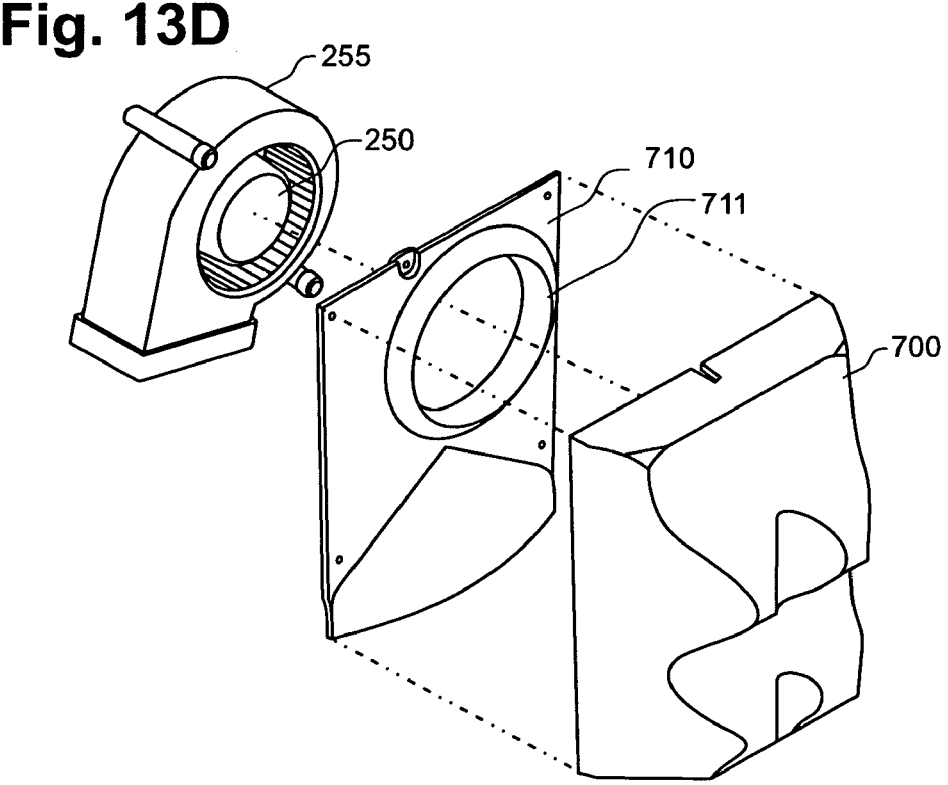
FIG. 13d is an exploded view of the fan/noise dampening assembly.

The alternate embodiment also comprises a noise dampening mechanism 700 as shown in FIGS. 13A through 13D. A front and side view showing cross sectional views of the dampening muffler 700 are shown in FIGS. 13A and 13B respectively. As can be seen in FIGS. 13A and 13B, the ambient air that is ingested into the intake valve 140 enters the muffler 700. The muffler 700 is made up of a plurality of curves or bends as part of the surface area of the molded material and is secured to a faceplate 710 that has a circular opening 711 as shown in FIG. 13D. The circular opening 711 is attached directly to the fan 250. When the fan 250 is operating, the noise generated by the motor 255 can be loud at times. In the normal case where the muffler 700 would not be present, the fan noise would travel in a direct path back out through the intake valve 140. In this embodiment, when the fan 250 is coupled to the muffler 700, the sound waves are muffled since there is no direct path back through the intake valve 140. As the sound waves travel through the air in the muffler 700, they are not only met with incoming air which impedes the sound pulses, they are also reflected and deflected back and forth through the muffler 700 thereby further impeding the sound from leaving the intake valve 140 as shown in FIG. 13C.

Additionally, the alternate embodiment includes a directional spout 840 that is attached to the hose 280 as shown in FIG. 14A. The spout 840 comprises two primary air paths. The first air path 841 is where most of the air expelled from the exhaust chamber 290 collects. The second air path 842 contains an opening 830 that is used to secure an aroma cartridge 800. The aroma cartridge 800 contains a scented card 805 securely fastened within the cartridge 800. The cartridge also comprises a variable scent control 810 that varies the size of the opening within the cartridge 800 for scented air to be released into the surrounding area as shown in FIGS. 14B and 14C. The spout 840 contains several holes 820 for releasing unscented air. As shown in FIG. 14D, the air expelled from the exhaust chamber 290 may follow one of two paths. The air that flows through path 841 remains unscented air, while the air that flows through path 842 becomes scented.

Figure 17:
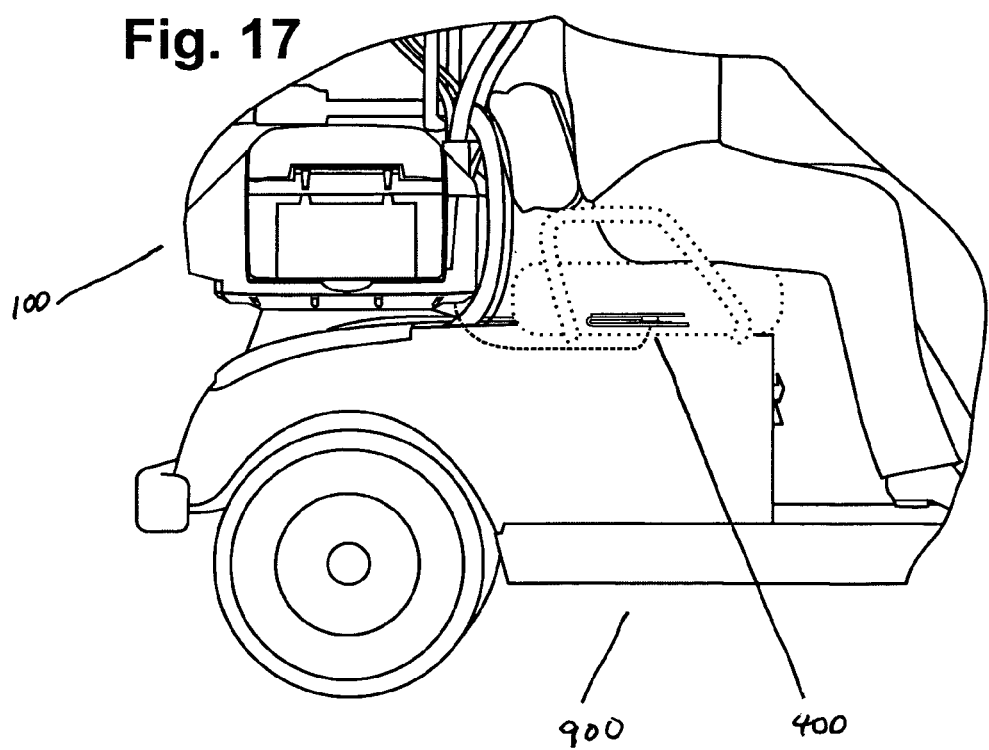
FIG. 17 is a detailed view of the portable air conditioner in conjunction with the seating switch when in use on a golf cart.

FIG. 15 demonstrates the entire air conditioning system including a semi-rigid rod 850 that is used to retain the spout 840 in a secure fashion. FIGS. 16 and 17 show the system in use in conjunction with the golf cart 900.

While the inventive apparatus, as well as a method of cooling ambient air as described and claimed herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

Although the invention has been described in detail with reference to one or more particular preferred embodiments, persons possessing ordinary skill in the art to which this invention pertains will appreciate that various modifications and enhancements may be made without departing from the spirit and scope of the claims that follow.

What is claimed is:

1. A portable air conditioner for cooling an air temperature outside of the portable air conditioner comprising:
 a. a reservoir;
  i. said reservoir further comprising a sealed container for storing chilled matter, said matter having a temperature that is lower than the air temperature outside of the portable air conditioner; said reservoir further comprising a top surface area, a bottom surface area, and an outer surface area said surface areas composed of a thermally conductive material;
 b. a power source;
 c. a motorized airflow generator coupled to said power source;
 d. an air duct; said air duct further comprising:
  i. an air intake chamber;
  ii. an exhaust chamber;
  iii. a central chamber;
   1. said central chamber further comprising a top area;
   2. said central chamber located between said air intake chamber and said exhaust chamber such that the top area of said central chamber includes the bottom surface area of said reservoir
 e. said motorized airflow generator coupled to said air duct;
 f. said motorized airflow generator such that when said airflow generator receives power from said power source, the airflow generator generates an airflow that originates from outside of said portable air conditioner and flows into said air intake chamber;
 g. said airflow having a temperature and continuing in motion such that said airflow may come in contact with said bottom surface area of said reservoir such that if said bottom surface area has a temperature that is less than the temperature of the airflow then the bottom surface area reduces the temperature of said airflow;
 h. said airflow continuing in motion such that said airflow enters said exhaust chamber and is expelled outside of said portable air conditioner;
 i. said bottom surface area of said reservoir further comprises at least one fin wherein said at least one fin is arranged in such a way that said airflow deflects off of said at least one fin in many directions before said airflow is expelled out of said exhaust chamber.

2. A portable air conditioner for cooling an air temperature outside of the portable air conditioner comprising:
 a. a reservoir;
  i. said reservoir further comprising a sealed container for storing chilled matter, said matter having a temperature that is lower than the air temperature outside of the portable air conditioner; said reservoir further comprising a top surface area, a bottom surface area, and an outer surface area said surface areas composed of a thermally conductive material;
 b. a power source;
 c. a motorized airflow generator coupled to said power source;
 d. an air duct; said air duct further comprising:

i. an air intake chamber;
ii. an exhaust chamber;
iii. a recessed area for receiving the bottom surface area of said reservoir;
e. said motorized airflow generator coupled to said air duct;
f. said motorized airflow generator coupled to said power source such that when said airflow generator receives power from said power source, the airflow generator generates an airflow that originates from outside of said portable air conditioner and flows into said air intake chamber;
g. said airflow having a temperature and continuing in motion such that said airflow may come in contact with said bottom surface area of said reservoir such that if said bottom surface area has a temperature that is less than the temperature of the airflow then the bottom surface area reduces the temperature of said airflow;
h. said airflow continuing in motion such that said airflow enters said exhaust chamber and is expelled outside of said portable air conditioner
i. said bottom surface area of said reservoir further comprises at least one fin such that said fin is aligned perpendicular to said bottom surface area of said reservoir wherein said at least one fin is arranged in such a way that said airflow is deflected of said at least one fin in many directions before said airflow is expelled out of said portable air conditioner.

3. The portable air conditioner of claim 1 further comprising:
a. a temperature switch;
i. said temperature switch further comprising a first and second hollow cylinder said first hollow cylinder further including a heating element coupled to said power source;
ii. said temperature switch is located within said exhaust chamber and is secured to a movable guide such that either the first or second hollow cylinders may provide a singular path for said airflow to travel from said central chamber and be expelled outside of said air conditioner.

4. The portable air conditioner of claim 1 further comprising:
a. a storage area;
Said storage area being coupled to the top surface of said reservoir and is enclosed by a cover; said cover further including a hinge such that said hinge is coupled to said reservoir such that said cover may pivot to either an open or a closed position said cover can be secured by a locking mechanism.

5. The portable air conditioner of claim 4 wherein said locking mechanism is a spring-loaded lock that secures said container to said air conditioner as well as preventing unauthorized access to said reservoir.

6. The portable air conditioner of claim 1 further comprising:
a. an aroma cartridge;
b. a directional air dispenser further comprising a first and second airway;
i. said directional air dispenser is coupled to said exhaust chamber such that said airflow may enter into said dispenser from said exhaust chamber;
ii. said aroma cartridge coupled to said second airway such that when said airflow enters into said dispenser from said exhaust chamber, said airflow may be expelled from either said first or second airway;
iii. said aroma cartridge further comprising a scented insert such that when said airflow enters said second airway, said airflow contacts said scented insert and becomes fragrant as said airflow is expelled from said second airway.

7. The portable air conditioner of claim 6 wherein said aroma cartridge further comprises a variable airflow outlet control such that said control varies the airflow through said second airway ranging from an open position to a closed position.

8. The portable air conditioner of claim 1 further comprising:
a. a noise dampening apparatus;
i. said noise dampening apparatus further comprising:
1. a hollow dampening chamber having curved or bent surface area;
2. said dampening chamber being coupled to said motorized airflow generator such that when said motorized airflow generator is operating said generator creates a sound wave having an amplitude such that said sound wave is impeded by said curved or bent surface area thereby decreasing said amplitude of said sound wave.

9. The portable air conditioner of claim 1 further comprising an open air vehicle having a seating area wherein said portable air conditioner is secured to said vehicle such that said airflow may be directed toward said seating area.

10. The portable air conditioner of claim 9 further comprising an external switch, said switch having an open and a closed position and being secured to the seating area of said open air vehicle such that when said seating area is occupied, said switch is changed to the closed position and triggers said air conditioner to begin ingesting air into said air intake chamber.

11. The portable air conditioner of claim 2 further comprising:
a. a temperature switch;
i. said temperature switch further comprising a first and second hollow cylinder said first hollow cylinder further including a heating element coupled to said power source;
ii. said temperature switch is located within said exhaust chamber and is secured to a movable guide such that either the first or second hollow cylinders may provide a singular path for said airflow to travel from said central chamber and be expelled outside of said air conditioner.

12. The portable air conditioner of claim 2 further comprising:
a. A storage area;
i. Said storage area being coupled to the top surface of said reservoir and is enclosed by a cover; said cover further including a hinge such that said hinge is coupled to said reservoir such that said cover may pivot to either an open or a closed position so that when said cover is in the closed position said cover can be secured by a locking mechanism.

13. The portable air conditioner of claim 12 wherein said locking mechanism is a spring-loaded lock that secures said container to said air conditioner as well as preventing unauthorized access to said reservoir.

14. The portable air conditioner of claim 2 further comprising:
a. an aroma cartridge;
b. a directional air dispenser further comprising a first and second airway;

i. said directional air dispenser is coupled to said exhaust chamber such that said airflow may enter into said dispenser from said exhaust chamber;
ii. said aroma cartridge coupled to said second airway such that when said airflow enters into said dispenser from said exhaust chamber, said airflow may be expelled from either said first or second airway;
iii. said aroma cartridge further comprising a scented insert such that when said airflow enters said second airway, said airflow contacts said scented insert and becomes fragrant as said airflow is expelled from said second airway.

15. The portable air conditioner of claim 14 wherein said aroma cartridge further comprises a variable airflow outlet control such that said control varies the airflow through said second airway ranging from an open position to a closed position.

16. The portable air conditioner of claim 2 further comprising:
   a. a noise dampening apparatus;
      i. said noise dampening apparatus further comprising:
         1. a hollow dampening chamber having curved or bent surface area;
         2. said dampening chamber being coupled to said motorized airflow generator such that when said motorized airflow generator is operating said generator creates a sound wave having an amplitude such that said sound wave is impeded by said curved or bent surface area thereby decreasing said amplitude of said sound wave.

17. The portable air conditioner of claim 2 further comprising an open air vehicle having a seating area wherein said portable air conditioner is secured to said vehicle such that said airflow may be directed toward said seating area.

18. The portable air conditioner of claim 17 further comprising an external switch, said switch having an open and a closed position and being secured to the seating area of said open air vehicle such that when said seating area is occupied, said switch is changed to the closed position and triggers said air conditioner to begin ingesting air into said air intake chamber.

* * * * *